United States Patent
Miranda et al.

(10) Patent No.: US 9,752,440 B2
(45) Date of Patent: Sep. 5, 2017

(54) TURBINE COMPONENT HAVING SURFACE COOLING CHANNELS AND METHOD OF FORMING SAME

(71) Applicant: General Electric Company, Schenectady, NY (US)

(72) Inventors: Carlos Miguel Miranda, Greer, SC (US); Andrew Lee Trimmer, Niskayuna, NY (US); Srikanth Chandrudu Kottilingam, Simpsonville, SC (US); Benjamin Paul Lacy, Greer, SC (US)

(73) Assignee: General Electric Company, Schenectady, NY (US)

( * ) Notice: Subject to any disclaimer, the term of this patent is extended or adjusted under 35 U.S.C. 154(b) by 245 days.

(21) Appl. No.: 14/725,695

(22) Filed: May 29, 2015

(65) Prior Publication Data

US 2016/0348512 A1 Dec. 1, 2016

(51) Int. Cl.
*F01D 5/18* (2006.01)
*F01D 9/04* (2006.01)
(Continued)

(52) U.S. Cl.
CPC ............... *F01D 5/18* (2013.01); *F01D 5/186* (2013.01); *F01D 5/187* (2013.01); *F01D 5/288* (2013.01);
(Continued)

(58) Field of Classification Search
CPC . F01D 5/18; F01D 5/186; F01D 5/187; F01D 5/288; F01D 25/12; F01D 9/06; F01D 9/065; F02C 3/04; F02C 7/18; F23R 3/002; F05D 2260/20; F05D 2260/201; F05D 2260/202; F05D 2260/22141; F05D 2230/90
(Continued)

(56) References Cited

U.S. PATENT DOCUMENTS 4,314,442 A  2/1982 Rice
4,664,597 A  5/1987 Auxier et al.
(Continued)

FOREIGN PATENT DOCUMENTS

EP  2230384 A2  9/2010
EP  2489837 A1  8/2012
(Continued)

OTHER PUBLICATIONS

European Search Report and Opinion issued in connection with corresponding European Application No. 16171651.9 on Nov. 9, 2016.

*Primary Examiner* — Steven Sutherland
(74) *Attorney, Agent, or Firm* — Armstrong Teasdale LLP

(57) ABSTRACT

A component for a turbine engine includes a substrate that includes a first surface, and an insert coupled to the substrate proximate the substrate first surface. The component also includes a channel. The channel is defined by a first channel wall formed in the substrate and a second channel wall formed by at least one coating disposed on the substrate first surface. The component further includes an inlet opening defined in flow communication with the channel. The inlet opening is defined by a first inlet wall formed in the substrate and a second inlet wall defined by the insert.

12 Claims, 12 Drawing Sheets

(51) Int. Cl.
  *F01D 25/12*   (2006.01)
  *F02C 3/04*    (2006.01)
  *F02C 7/18*    (2006.01)
  *F23R 3/00*    (2006.01)
  *F01D 5/28*    (2006.01)

(52) U.S. Cl.
  CPC ............. *F01D 9/041* (2013.01); *F01D 25/12* (2013.01); *F02C 3/04* (2013.01); *F02C 7/18* (2013.01); *F23R 3/002* (2013.01); *F05D 2220/32* (2013.01); *F05D 2230/10* (2013.01); *F05D 2240/128* (2013.01); *F05D 2240/30* (2013.01); *F05D 2240/35* (2013.01); *F05D 2260/204* (2013.01); *F05D 2270/3062* (2013.01); *Y02T 50/676* (2013.01)

(58) Field of Classification Search
  USPC ........... 416/96 R, 96 A, 97 R, 241 R, 241 B; 415/115
  See application file for complete search history.

(56) References Cited

U.S. PATENT DOCUMENTS

| | | |
|---|---|---|
| 4,672,727 A | 6/1987 | Field |
| 4,676,719 A | 6/1987 | Auxier et al. |
| 5,419,681 A | 5/1995 | Lee |
| 5,651,662 A | 7/1997 | Lee et al. |
| 5,660,525 A | 8/1997 | Lee et al. |
| 5,957,657 A | 9/1999 | Akita et al. |
| 6,234,755 B1 | 5/2001 | Bunker et al. |
| 6,247,896 B1 | 6/2001 | Auxier et al. |
| 6,280,140 B1 | 8/2001 | Soechting et al. |
| 6,582,194 B1 | 6/2003 | Birkner et al. |
| 6,617,003 B1 | 9/2003 | Lee et al. |
| 6,905,302 B2 | 6/2005 | Lee et al. |
| 7,255,534 B2 | 8/2007 | Liang |
| 7,553,534 B2 | 6/2009 | Bunker |
| 7,563,073 B1 | 7/2009 | Liang |
| 7,625,180 B1 * | 12/2009 | Liang ..................... F01D 5/186 29/889.2 |
| 7,988,418 B2 | 8/2011 | Cunha et al. |
| 8,109,726 B2 | 2/2012 | Liang |
| 8,182,224 B1 | 5/2012 | Liang |
| 8,231,330 B1 | 7/2012 | Liang |
| 2012/0057969 A1 | 3/2012 | Jiang et al. |
| 2012/0076644 A1 * | 3/2012 | Zuniga ..................... F01D 5/186 415/178 |
| 2012/0325451 A1 | 12/2012 | Bunker |
| 2012/0328448 A1 | 12/2012 | Bunker |
| 2014/0126995 A1 | 5/2014 | Schick et al. |
| 2014/0331641 A1 * | 11/2014 | Reinert ................... F01D 5/187 60/39.83 |

FOREIGN PATENT DOCUMENTS

| | | |
|---|---|---|
| EP | 2559856 A2 | 2/2013 |
| JP | S5742473 A | 3/1982 |

* cited by examiner

1

TURBINE COMPONENT HAVING SURFACE COOLING CHANNELS AND METHOD OF FORMING SAME

STATEMENT REGARDING FEDERALLY SPONSORED RESEARCH & DEVELOPMENT

This invention was made with Government support under contract number DE-FC26-05NT42643 awarded by the Department of Energy. The government has certain rights in this invention.

BACKGROUND

The field of the disclosure relates generally to turbine components, and more particularly to surface cooling channels for a turbine component.

At least some known rotary machines, such as gas turbines, include rows of turbine blades that extract energy from a flow of hot gas generated, for example, by combusting fuel and air in a combustor. At least some known components along the path of the hot gas are subjected to high temperatures that can degrade the components, requiring costly repair and/or replacement operations. To improve an operating life of such components, at least some known turbine components include micro-channels defined therein and configured to distribute a cooling fluid within the turbine components. However, such micro-channels typically require very tight manufacturing tolerances, and at least some known methods for forming components having such micro-channels require specialized equipment, resulting in a high cost and time-intensive labor requirement for the turbine components.

BRIEF DESCRIPTION

In one aspect, a component for a turbine engine is provided. The component includes a substrate that includes a first surface, and an insert coupled to the substrate proximate the substrate first surface. The component also includes a channel. The channel is defined by a first channel wall formed in the substrate and a second channel wall formed by at least one coating disposed on the substrate first surface. The component further includes an inlet opening defined in flow communication with the channel. The inlet opening is defined by a first inlet wall formed in the substrate and a second inlet wall defined by the insert.

In another aspect, a turbine engine is provided. The turbine engine includes a combustor section configured to generate a hot gas, and a component disposed along a path configured to be traversed by the hot gas. The component includes a substrate that includes a first surface, and an insert coupled to the substrate proximate the substrate first surface. The component also includes a channel. The channel is defined by a first channel wall formed in the substrate and a second channel wall formed by at least one coating disposed on the substrate first surface. The component further includes an inlet opening defined in flow communication with the channel. The inlet opening is defined by a first inlet wall formed in the substrate and a second inlet wall defined by the insert.

In another aspect, a method of forming a component for a turbine engine is provided. The method includes forming a first channel wall of a channel in a substrate, and forming a first inlet wall of an inlet opening in the substrate. The method also includes coupling an insert to the substrate proximate a first surface of the substrate. The insert defines a second inlet wall of the inlet opening. The method further includes disposing at least one coating on the substrate first surface. The at least one coating forms a second channel wall of the channel. The inlet opening is defined in flow communication with the channel.

DETAILED DESCRIPTION

The exemplary components and methods described herein overcome at least some of the disadvantages associated with known turbine components having micro-channels. The embodiments described herein include a channel defined by a first channel wall formed in a substrate of the component and a second channel wall formed by at least one coating disposed on a first surface of the substrate. The embodiments described herein also include an insert coupled proximate the first surface, and an inlet opening defined by a first inlet wall formed in the substrate and a second inlet wall defined by the insert. The embodiments described herein further include forming the channel and inlet opening in the substrate using commercial, off-the-shelf devices.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
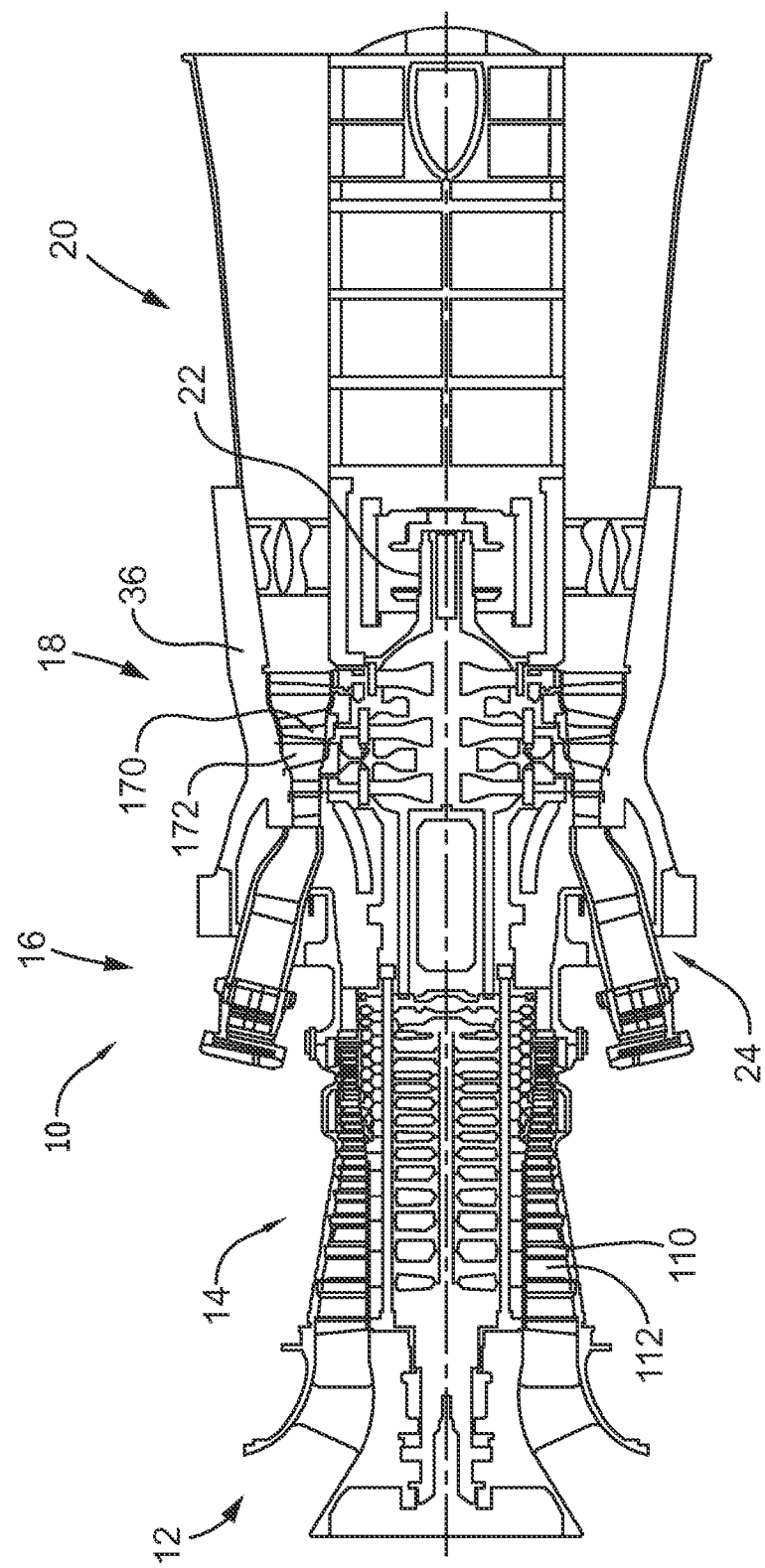
FIG. 1 is a schematic view of an exemplary gas turbine.

FIG. 1 is a schematic view of an exemplary rotary machine 10 with which embodiments of the turbine components of the current disclosure may be used. In the exemplary embodiment, rotary machine 10 is a gas turbine that includes an intake section 12, a compressor section 14 coupled downstream from intake section 12, a combustor section 16 coupled downstream from compressor section 14, a turbine section 18 coupled downstream from combustor section 16, and an exhaust section 20 coupled downstream from turbine section 18. A generally tubular casing 36 at least partially encloses one or more of intake section 12, compressor section 14, combustor section 16, turbine section 18, and exhaust section 20.

In the exemplary embodiment, turbine section 18 is coupled to compressor section 14 via a rotor shaft 22. It should be noted that, as used herein, the term "couple" is not limited to a direct mechanical, electrical, and/or communication connection between components, but may also include an indirect mechanical, electrical, and/or communication connection between multiple components.

During operation of gas turbine 10, intake section 12 channels air towards compressor section 14. Compressor section 14 compresses the air to a higher pressure and temperature. More specifically, rotor shaft 22 imparts rotational energy to at least one circumferential row of compressor blades 110 coupled to rotor shaft 22 within compressor section 14. In the exemplary embodiment, each row of compressor blades 110 is preceded by a circumferential row of compressor stator vanes 112 extending radially inward from casing 36 that direct the air flow into compressor blades 110. The rotational energy of compressor blades 110 increases a pressure and temperature of the air. Compressor section 14 discharges the compressed air towards combustor section 16.

In combustor section 16, the compressed air is mixed with fuel and ignited to generate combustion gases that are channeled towards turbine section 18. More specifically, combustor section 16 includes at least one combustor 24, in which a fuel, for example, natural gas and/or fuel oil, is injected into the air flow, and the fuel-air mixture is ignited to generate high temperature combustion gases, or "hot gas," that are channeled towards turbine section 18.

Turbine section 18 converts the thermal energy from the hot gas to mechanical rotational energy. More specifically, the hot gas imparts rotational energy to at least one circumferential row of rotor blades 170 coupled to rotor shaft 22 within turbine section 18. In the exemplary embodiment, each row of rotor blades 170 is preceded by a circumferential row of turbine stator vanes 172 extending radially inward from casing 36 that direct the combustion gases into rotor blades 170. Rotor shaft 22 may be coupled to a load (not shown) such as, but not limited to, an electrical generator and/or a mechanical drive application. The exhausted combustion gases flow downstream from turbine section 18 into exhaust section 20.

Various components of gas turbine 10 are disposed along a path configured to be traversed by the hot gas. Examples of such "hot gas path" components include a liner of at least one combustor 24, turbine rotor blades 170, turbine stator vanes 172, a turbine shroud within casing 36, and a turbine nozzle proximate exhaust section 20. It should be understood that the preceding examples are merely illustrative and not intended to be limiting.

Figure 2:
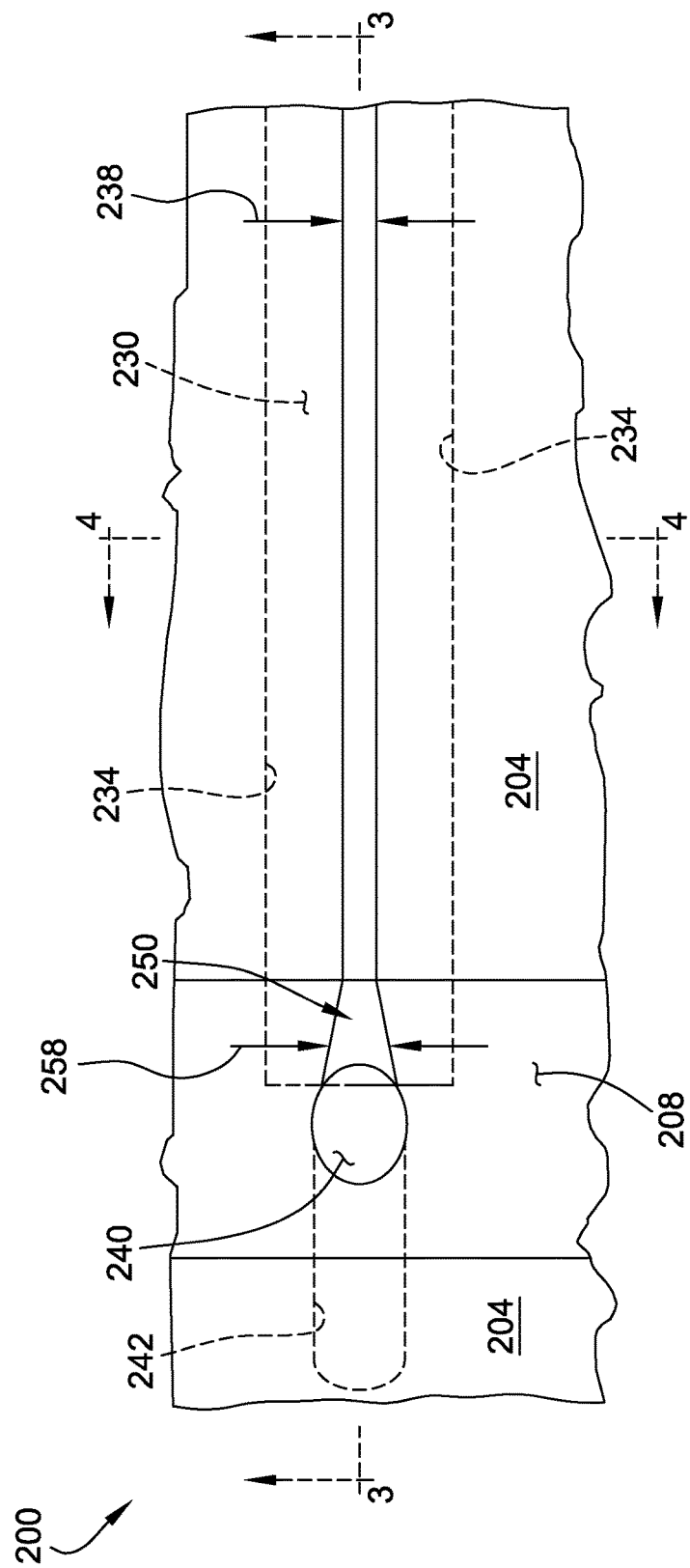
FIG. 2 is a schematic plan view of an exemplary embodiment of a component that may be used with the gas turbine shown in FIG. 1.
Figure 3:
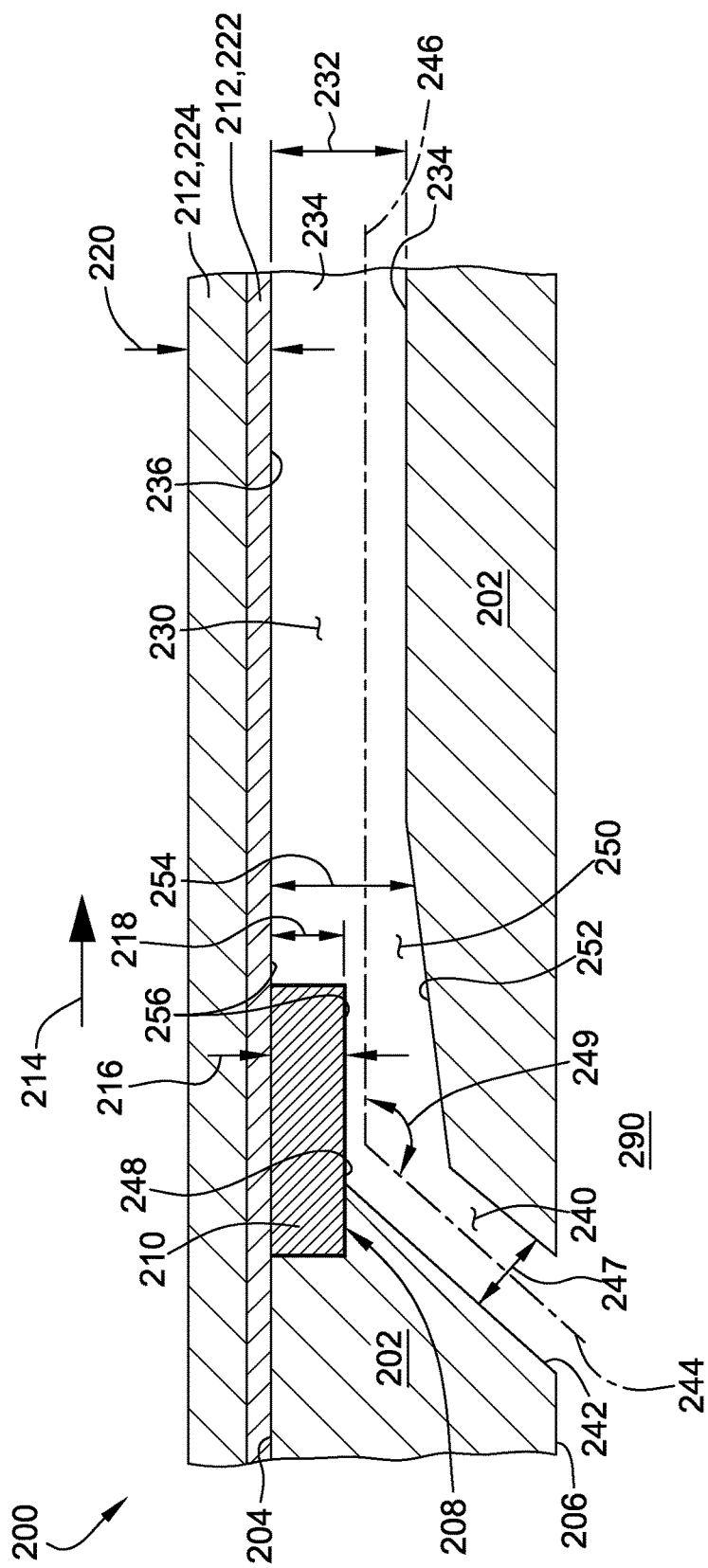
FIG. 3 is a schematic section view of the component shown in FIG. 2, taken along lines 3-3 shown in FIG. 2.
Figure 4:
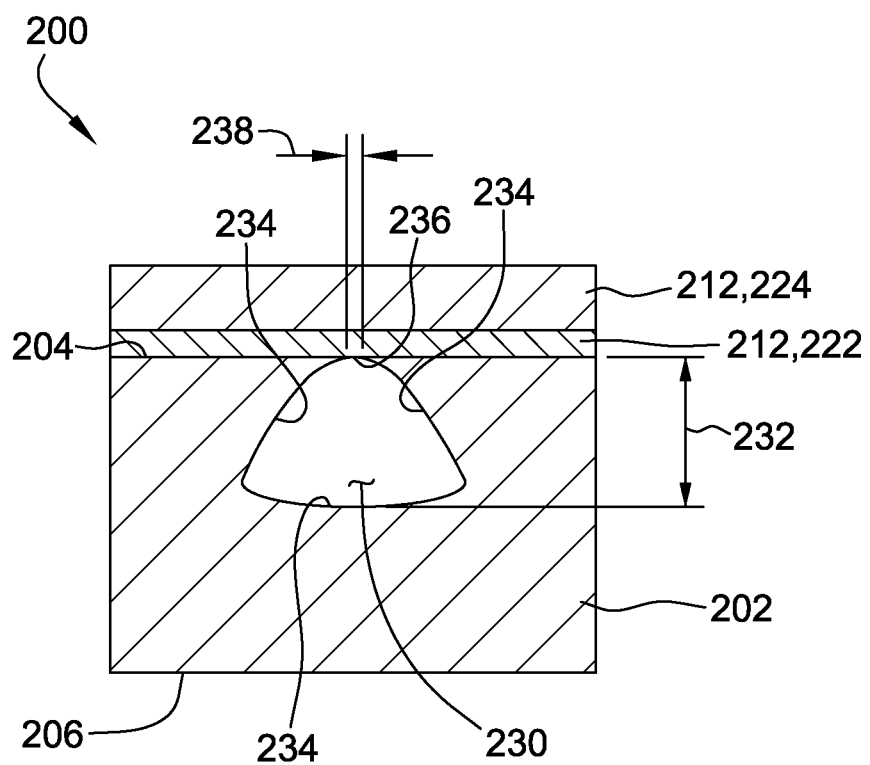
FIG. 4 is a schematic section view of the component shown in FIG. 2, taken along lines 4-4 shown in FIG. 2.

FIG. 2 is a schematic plan view of an exemplary embodiment of a hot gas path component 200 that may be used with gas turbine 10. FIG. 3 is a schematic section view of hot gas path component 200 taken along lines 3-3 shown in FIG. 2. FIG. 4 is a schematic section view of hot gas path component 200 taken along lines 4-4 shown in FIG. 2. With reference to FIGS. 2-4, hot gas path component 200 includes a substrate 202 that extends from a first surface 204 to a second surface 206. An insert 210 is coupled to substrate 202 proximate first surface 204. In certain embodiments, a recess 208 defined in first surface 204 is configured to receive insert 210. Recess 208 is configured to facilitate forming hot gas path component 200, as will be described herein. In alternative embodiments, hot gas path component 200 does not include recess 208.

In certain embodiments, a shape of insert 210 is complementary to a shape of recess 208. For example, but without limitation, in the exemplary embodiment, recess 208 extends with a generally rectangular cross-section, and insert 210 has a complementary rectangular prismatic shape. Thus, in the exemplary embodiment, a thickness 216 of insert 210 is substantially equal to a depth 218 of recess 208, such that insert 210 is configured to be substantially flush with first surface 204. In other alternative embodiments, the shape of insert 210 is other than complementary to the shape of recess 208. For example, in some such alternative embodiments, thickness 216 is other than substantially equal to depth 218, such that insert 210 is configured to be other than substantially flush with first surface 204.

At least one coating 212 is disposed on first surface 204. Insert 210 and the at least one coating 212 are hidden in FIG. 2 to enable a better view of first surface 204 and recess 208. In certain embodiments, the at least one coating 212 also is disposed on insert 210. The at least one coating 212 is configured to be positioned adjacent a hot gas flow path 214 within gas turbine 10 (shown in FIG. 1), while substrate second surface 206 is configured to be disposed adjacent a plenum 290. Plenum 290 is configured to provide a supply of a cooling fluid.

It should be understood that, in some embodiments, first surface 204 extends in three dimensions to define an outer surface of substrate 202, while second surface 206 is substantially enclosed in an interior of hot gas path component 200. For example, but without limitation, second surface 206 at least partially encloses plenum 290 within an interior of hot gas path component 200. In alternative embodiments, second surface 206 also at least partially defines an outer surface of hot gas path component 200, such as but without limitation a radially outer surface of a liner of combustor 24, and/or plenum 290 is disposed external to hot gas path component 200.

In certain embodiments, substrate 202 is formed from a high strength superalloy metal, such as, but without limitation, at least one of a nickel-based, cobalt-based, an iron-based superalloy, a nickel-aluminum intermetallic alloy, a niobium-based alloy, and a molybdenum-based alloy. In alternative embodiments, substrate 202 is formed from a ceramic matrix composite, such as, but without limitation, a silicon carbide matrix reinforced with silicon carbide fibers. In other alternative embodiments, substrate 202 is formed from a titanium-aluminum-based intermetallic compound.

In certain embodiments, insert 210 is formed from a braze material. A braze material is a material that has a lower melting point than a melting point of substrate 202 and provides a substantial match with other select chemical properties of substrate 202, such that relatively reduced chemical activity occurs between the braze material and substrate 202. In alternative embodiments, insert 210 is formed from any suitable material that enables hot gas path component 200 to function as described herein. In certain embodiments, thickness 216 of insert 210 is within a range of about 5 to 40 mils. Moreover, in certain embodiments, thickness 216 is within a range of about 15 to 25 mils. In a particular embodiment, thickness 216 is about 25 mils.

In certain embodiments, the at least one coating 212 has a thickness 220 in a range of about 4 to 80 mils. Moreover, in certain embodiments, thickness 220 is in a range of about 4 to 40 mils. Moreover, in certain embodiments, thickness 220 is in a range of about 4 to 20 mils. Moreover, in certain embodiments, thickness 220 is in a range of about 4 to 10 mils. In alternative embodiments, the at least one coating 212 has any suitable thickness 220 that enables hot gas path component 200 to function as described herein.

In some embodiments, the at least one coating 212 is deposited on first surface 204 and insert 210 by at least one of an ion plasma deposition process, a high velocity oxygen fuel spraying process, a high velocity air fuel spraying process, an atmospheric pressure plasma spraying process, a low pressure plasma spraying process, a cold spraying process, a sputtering process, an electron beam physical vapor deposition process, an electroless plating process, and an electroplating process. It should be understood that each of the at least one coatings 212 may be applied by a different one of such processes. In alternative embodiments, the at least one coating 212 is applied to first surface 204 and, optionally, insert 210 using any suitable process that enables hot gas path component 200 to function as described herein.

In the exemplary embodiment, the at least one coating 212 includes a bond coating 222 disposed on substrate first surface 204 and insert 210, and a thermal barrier coating 224 disposed on bond coating 222. For example, thermal barrier coating 224 is any suitable coating that impedes a transfer of heat from hot combustion gases to substrate 202, and bond coating 222 is any suitable coating that promotes adhesion of thermal barrier coating 224 to at least one of substrate 202 and insert 210. In alternative embodiments, the at least one coating 212 includes any suitable number and types of coatings that enable hot gas path component 200 to function as described herein.

Hot gas path component 200 includes at least one channel 230 defined in substrate 202. The at least one channel 230 is also referred to herein as at least one "micro-channel" 230. In certain embodiments, such as, for example but without limitation, in a gas turbine 10 sized for industrial power generation, each at least one channel 230 has a depth 232 in a range of about 10 to 100 mils. In other embodiments, such as, for example but without limitation, in a gas turbine 10 sized for aviation applications, depth 232 is in a range of about 6 to 20 mils. In alternative embodiments, each at least one micro-channel 230 has any suitable depth 232 that enables hot gas path component 200 to function as described herein. In the exemplary embodiment, each at least one channel 230 has a flattened teardrop, or "reentrant," cross-sectional shape (shown in FIG. 4). In alternative embodiments, each at least one channel 230 has any suitable cross-sectional shape that enables hot gas path component 200 to function as described herein.

In certain embodiments, each at least one micro-channel 230 is defined by a first channel wall 234 formed in substrate 202, and a second channel wall 236 formed by the at least one coating 212. Thus, second channel wall 236 defined by the at least one coating 212 spans a gap 238 (best seen in FIG. 2) defined in substrate first surface 204. In certain embodiments, gap 238 is less than about 20 mils. Moreover, in certain embodiments, gap 238 is less than about 10 mils. The relatively small size of gap 238 enables the at least one coating 212 to form second channel wall 236 in a sufficiently structurally stable fashion to enable micro-channel 230 to function as described herein.

For example, in the exemplary embodiment, first channel wall 234 defined in substrate 202 includes opposing sidewalls and a bottom wall of the reentrant shape of micro-channel 230, and second channel wall 236 defined by the at least one coating 212 includes a top wall of the reentrant shape of micro-channel 230. It should be understood that the terms "top," "bottom," and "side" are used herein for illustrative purposes only, and do not imply that the disclosure herein is limited to any particular orientation of micro-channel 230 with respect to substrate 202.

A corresponding inlet opening 240 is defined in substrate 202 in flow communication with each at least one micro-channel 230. Each inlet opening 240 also is defined in flow communication with plenum 290. In operation, cooling fluid (not shown) flows from plenum 290 through inlet opening 240 and into micro-channel 230, where the cooling fluid transfers heat away from substrate 202. In certain embodiments, the cooling fluid exits micro-channel 230 through an exit opening (not shown) defined in at least one of the at least one coating 212 and substrate 202, and is discharged into hot gas flow path 214. In alternative embodiments, the cooling fluid exits micro-channel 230 in any suitable fashion that enables hot gas path component 200 to function as described herein.

In certain embodiments, inlet opening 240 is at least partially defined by a first inlet wall 242 formed in substrate 202. For example, in the exemplary embodiment, first inlet wall 242 defines inlet opening 240 having a cylindrical cross-section proximate second surface 206. In certain embodiments, inlet opening 240 has a diameter 247 in a range of about 10 to 80 mils. Moreover, in certain embodiments, diameter 247 is in a range of about 20 to 40 mils. In a particular embodiment, diameter 247 is about 30 mils. In alternative embodiments, inlet opening 240 has any suitable cross-sectional shape and size that enables hot gas path component 200 to function as described herein.

In some embodiments, inlet opening 240 extends from second surface 206 to recess 208, such that inlet opening 240 is further defined by a second inlet wall 248 defined by insert 210. In alternative embodiments, inlet opening 240 does not extend to recess 208, and no portion of inlet opening 240 is defined by insert 210. In alternative embodiments, inlet opening 240 is defined in hot gas path component 200 in any suitable fashion that enables hot gas path component 200 to function as described herein.

In some embodiments, a longitudinal axis 244 of inlet opening 240 intersects a longitudinal axis 246 of micro-channel 230 at an angle 249 that is obtuse. Obtuse angle 249 reduces a pressure loss of a coolant flow through inlet opening 240 and micro-channel 230, as compared to angle 249 being less than or approximately equal to ninety degrees (not shown). In alternative embodiments, longitudinal axis 244 of inlet opening 240 intersects longitudinal axis 246 of micro-channel 230 at an angle that is other than obtuse.

In certain embodiments, a transition region 250 is disposed between, and defined in flow communication with, micro-channel 230 and inlet opening 240. Transition region 250 is at least partially defined by a first transition wall 252 formed in substrate 202. A depth 254 of transition region 250, measured with respect to first surface 204, decreases between inlet opening 240 and micro-channel 230. Transition region 250 thus facilitates reducing stress concentrations in substrate 202 at an interface between inlet opening 240 and micro-channel 230. Additionally, transition region 250 facilitates forming hot gas path component 200, as will be described herein.

For example, in the exemplary embodiment, depth 254 decreases steadily from an initial value adjacent inlet opening 240 until it approximately matches micro-channel depth 232 adjacent micro-channel 230. Transition region 250 thus facilitates reducing stress concentrations in substrate 202 by replacing a single, relatively sharp cornered interface between first inlet wall 242 and first channel wall 234 with two relatively softer-cornered interfaces between first inlet wall 242 and first transition wall 252, and between first transition wall 252 and first channel wall 234.

In certain embodiments, the cross-sectional shape of transition region 250 maintains a generally reentrant shape as depth 254 increases away from micro-channel 230, and then transitions into a generally cylindrical shape of inlet opening 240 adjacent first inlet wall 242. Moreover, in some embodiments, a cross-sectional area of transition region 250 is configured to vary along micro-channel longitudinal axis 246 to facilitate achieving a selected flow rate of cooling fluid from inlet opening 240 into micro-channel 230. In certain embodiments, the cross-sectional area of transition region 250 is greater than a cross-sectional area of inlet opening 240 to facilitate avoiding a flow restriction between inlet opening 240 and micro-channel 230. In alternative embodiments, transition region 250 has any suitable cross-sectional shape that enables hot gas path component 200 to function as described herein.

In some embodiments, transition region 250 is further defined by a second transition wall 256 formed at least partially by insert 210. Thus, second transition wall 256 spans a gap 258 (best seen in FIG. 2) defined in substrate 202 that is in flow communication with gap 238 in substrate first surface 204. In certain embodiments, gap 258 decreases between inlet opening 240 and micro-channel 230. For example, in the exemplary embodiment, gap 258 decreases steadily from an initial value adjacent inlet opening 240 until it approximately matches gap 238 adjacent micro-channel 230. Gap 258 facilitates forming hot gas path component 200, as will be described herein. In alternative embodiments, gap 258 increases or remains substantially constant between inlet opening 240 and micro-channel 230. In other alternative embodiments, substrate 202 does not include gap 258.

In the exemplary embodiment, second transition wall 256 also is formed at least partially by the at least one coating 212 spanning gap 238. In alternative embodiments, transition region 250 is disposed entirely adjacent recess 208 with respect to micro-channel longitudinal axis 246, such that second transition wall 256 is formed substantially entirely by insert 210.

Figure 5:
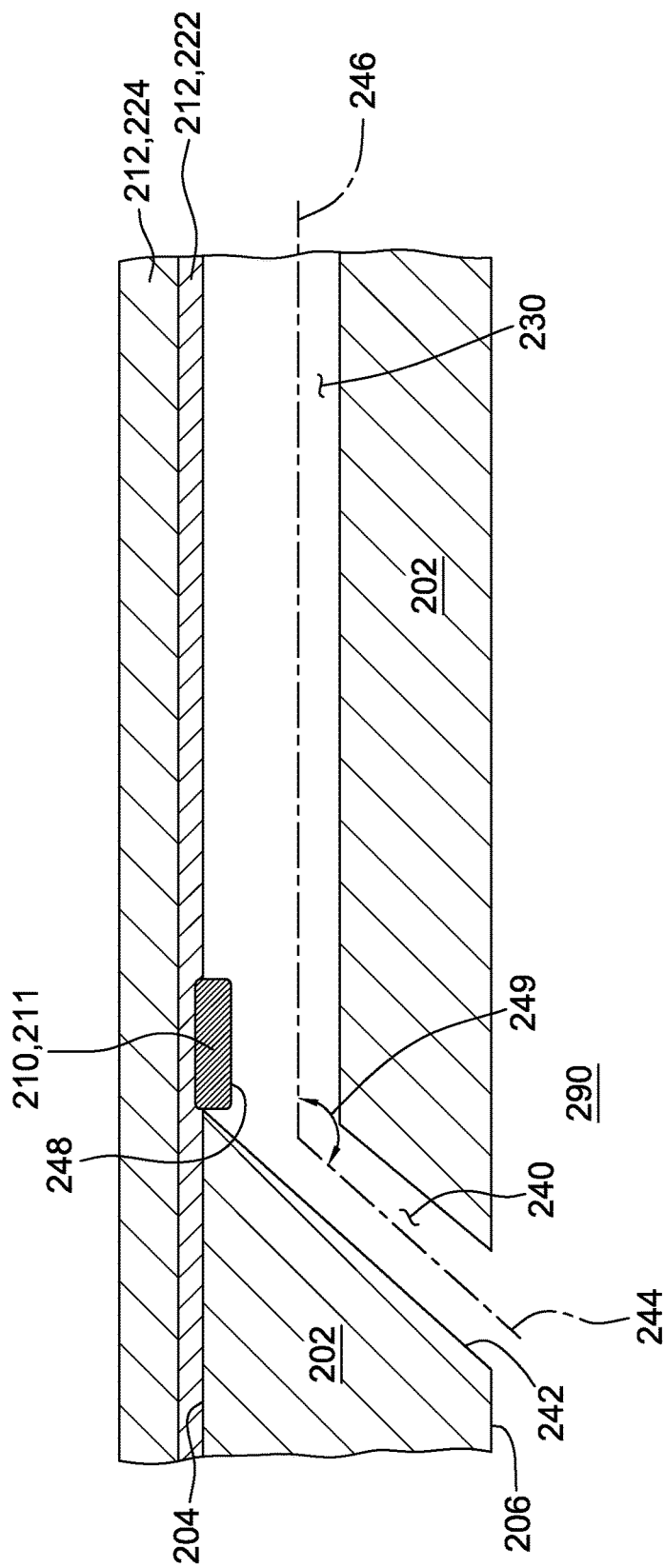
FIG. 5 is a schematic section view of an exemplary alternative embodiment of the component shown in FIGS. 2-4.

In alternative embodiments, micro-channel 230 and inlet opening 240 are defined in flow communication via any other suitable interface at least partially defined in substrate 202. For example, but without limitation, FIG. 5 is a schematic section view of an alternative embodiment of hot gas path component 200 which is substantially similar to the embodiment of FIGS. 2-4, except as otherwise noted. In particular, hot gas path component 200 in the embodiment of FIG. 5 does not include transition region 250, such that inlet opening 240 is defined intersecting micro-channel 230 at obtuse angle 249. In addition, substrate 202 does not include recess 208. Instead, insert 210 is a plug 211 disposed in inlet opening 240 proximate substrate first surface 204 to define second inlet wall 248. Although some of the benefits of transition region 250 described above with respect to the embodiment of FIGS. 2-4 are reduced in the embodiment of FIG. 5, the embodiment of FIG. 5 provides a relatively reduced manufacturing complexity. For example, in the exemplary embodiment, plug 211 is formed by depositing a spot of at least one of a weld material and a braze material on inlet opening 240 proximate substrate first surface 204, and cleaning the spot to form plug 211 such that it is configured to be covered smoothly by the at least one coating 212. In alternative embodiments, plug 211 is formed in any suitable fashion that enables hot gas path component 200 to function as described herein.

Figure 6:
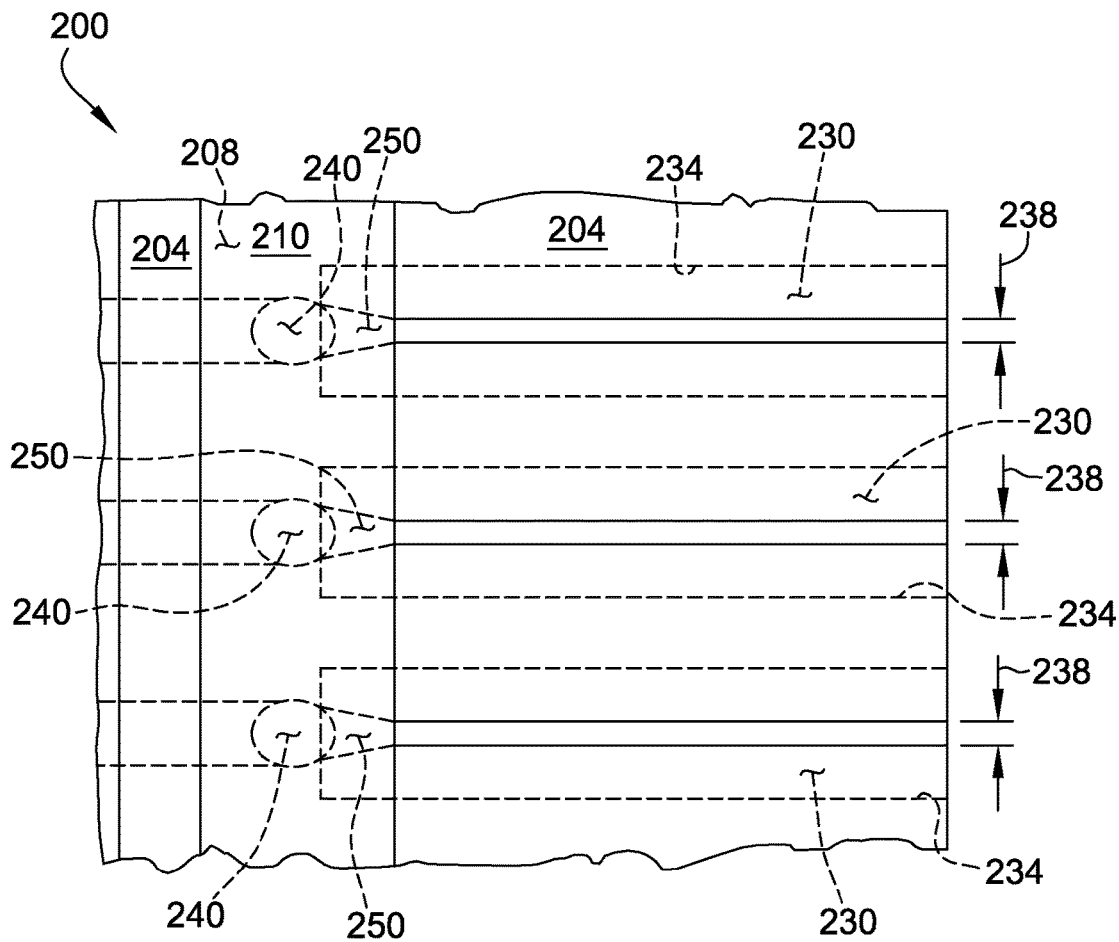
FIG. 6 is a schematic plan view of the component shown in FIGS. 2-4 that illustrates a plurality of channels defined in a substrate of the exemplary component.

It should be understood that in certain embodiments, the at least one channel 230 is a plurality of channels 230. For example, FIG. 6 is a schematic plan view of hot gas path component 200 that illustrates a plurality of micro-channels 230 defined in substrate 202. In the exemplary embodiment, plurality of micro-channels 230 are disposed substantially parallel to each other. The at least one coating 212 is hidden in FIG. 6 to enable a better view of first surface 204 and insert 210. In alternative embodiments, plurality of micro-channels 230 is disposed other than substantially parallel to each other. Any suitable number and configuration of micro-channels 230 may be defined in hot gas path component 200 that enables hot gas path component 200 to function as described herein.

In the exemplary embodiment, each of the plurality of micro-channels 230 is defined in flow communication with a corresponding inlet opening 240, and each inlet opening 240 is defined in flow communication with a single plenum 290 (shown in FIG. 3). In alternative embodiments, any suitable number of micro-channels 230 is defined in flow communication with each inlet opening 240, and each inlet opening 240 is defined in flow communication with at least one of a plurality of plenums 290. Any suitable number and configuration of inlet openings 240 may be defined in hot gas path component 200, and any suitable number and configuration of plenums 290 may be defined in hot gas path component 200 and/or disposed adjacent hot gas path component 200, that enables hot gas path component 200 to function as described herein.

In certain embodiments, a plurality of inlet openings 240 extend to a single recess 208 defined in substrate first surface 204. In some such embodiments, a single insert 210 extends across the plurality of inlet openings 240, such that insert 210 defines second inlet wall 248 (as shown in FIG. 3) for each of the plurality of inlet openings 240 as shown in FIG. 6. For example, in the exemplary embodiment, recess 208 extends with a generally rectangular cross-section across substrate first surface 204 and receives three inlet openings 240, and a single insert 210 having a generally rectangular prismatic shape complementary to recess 208 is disposed in recess 208. In some embodiments, defining a plurality of inlet openings 240 that extend to a single recess 208 configured to receive a single insert 210 reduces a manufacturing complexity of hot gas path component 200. In alternative embodiments, the plurality of inlet openings 240 extend to any suitable number of separately defined recesses 208, and/or any suitable number of inserts 210 is inserted into each recess 208, that enables hot gas path component 200 to function as described herein.

Figure 7:
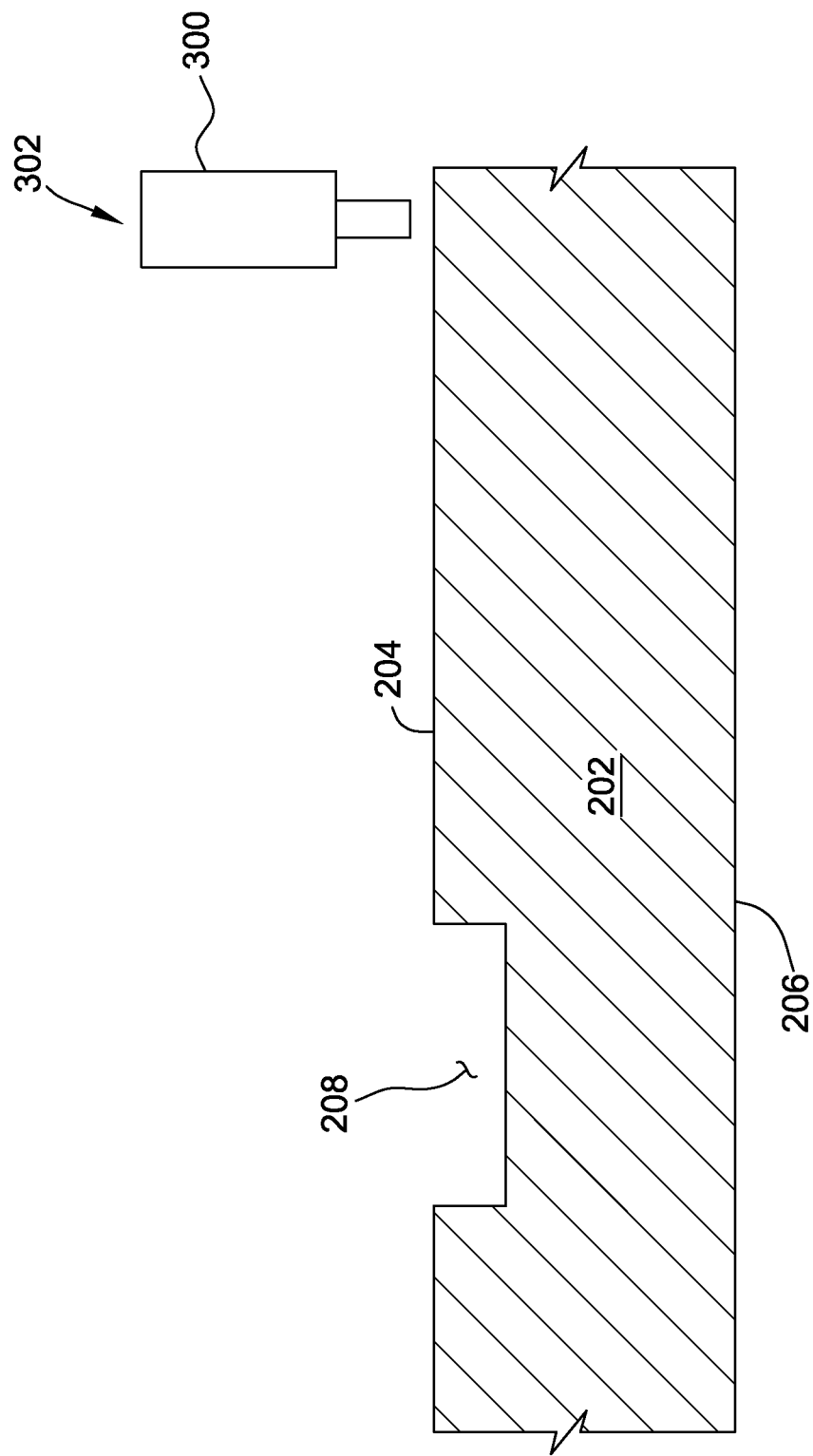
FIG. 7 is a schematic section view of an exemplary substrate of the component shown in FIGS. 2-4 prior to formation of a channel, with an exemplary first forming tool positioned at a first position with respect to the exemplary substrate.

FIGS. 7-12 illustrate an exemplary embodiment of a method of forming hot gas path component 200. FIG. 7 is a schematic section view of substrate 202 prior to formation of micro-channel 230, inlet opening 240, and transition region 250, with an exemplary first forming tool 300 positioned at a first position 302 with respect to substrate 202. In the exemplary embodiment, substrate 202 includes recess 208. In alternative embodiments, such as the embodiment shown in FIG. 5, substrate 202 does not include recess 208.

For example, in the exemplary embodiment, recess 208 is defined in substrate 202 as substrate 202 is formed by a suitable casting process. In alternative embodiments, recess 208 is defined in substrate 202 as substrate 202 is formed by a suitable material deposition process. In other alternative embodiments, substrate 202 is initially formed without recess 208 by any suitable process, and recess 208 is then formed in substrate 202 by a suitable separate process, such as a machining process. In still other alternative embodiments, recess 208 is formed in substrate 202 by any suitable process that enables hot gas path component 200 to function as described herein.

In certain embodiments, first forming tool 300 is at least one of an abrasive liquid jet, a plunge electrochemical machining (ECM) tool, an electric discharge machining (EDM) tool with a spinning single point electrode ("milling" EDM), and a laser machining (laser drilling) tool. For example, in the exemplary embodiment, first forming tool 300 is a suitable commercial, off-the-shelf device that emits an abrasive water jet 350 that includes a high-velocity stream of abrasive particles (e.g., abrasive "grit") suspended in water. In alternative embodiments, first forming tool 300 is any other suitable forming tool that enables hot gas path component 200 to be formed as described herein.

Figure 8:
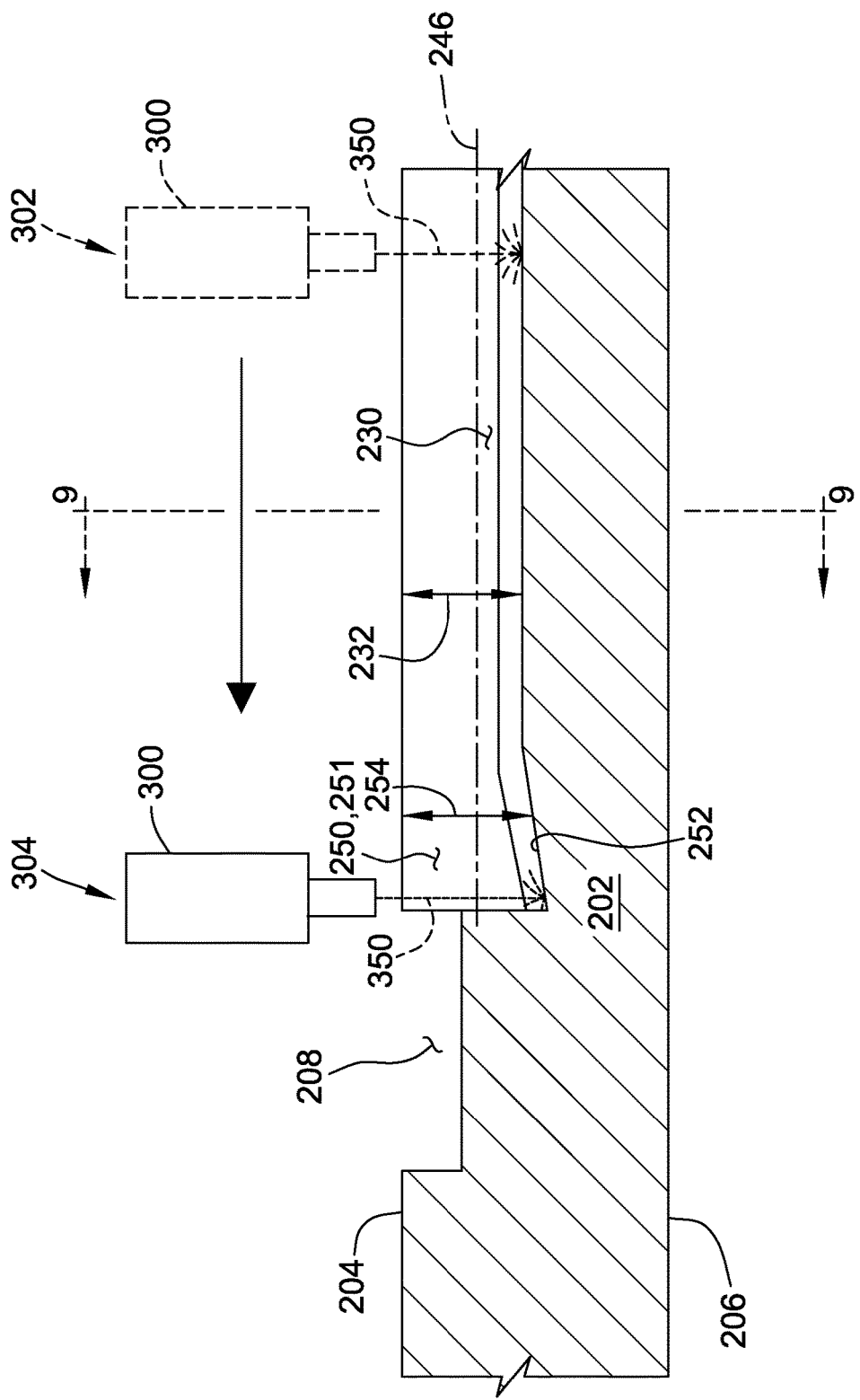
FIG. 8 is a schematic section view of the exemplary substrate shown in FIG. 7 during formation of an exemplary channel.
Figure 9:
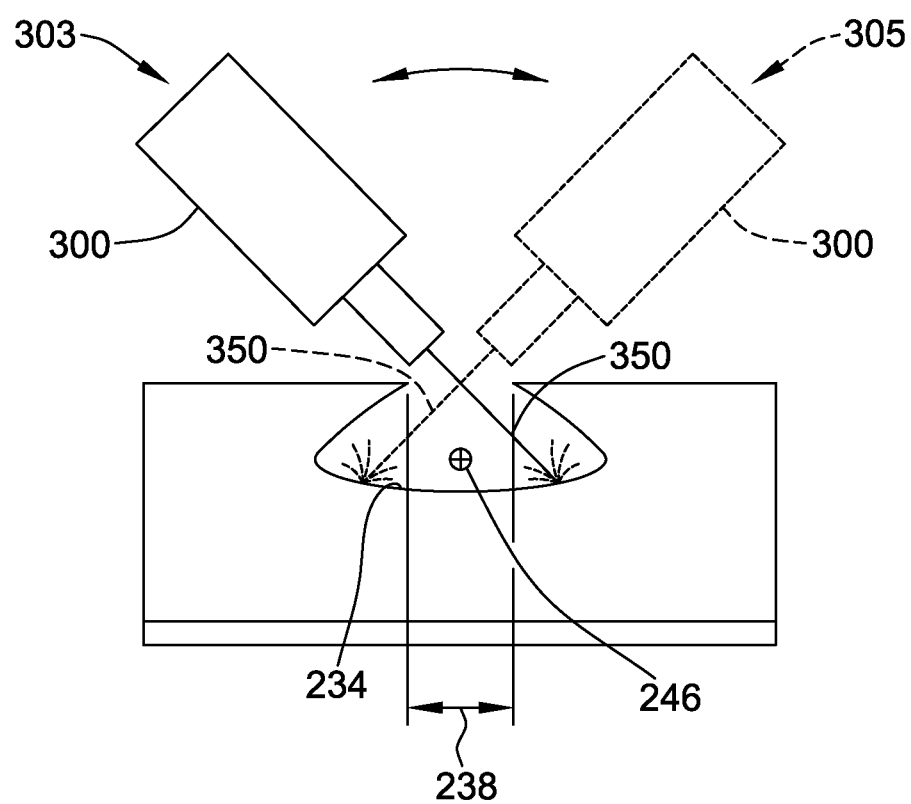
FIG. 9 is a schematic section view of the exemplary substrate shown in FIGS. 7 and 8 during formation of a channel, taken along lines 9-9 shown in FIG. 8.

FIG. 8 is a schematic section view of substrate 202 during formation of micro-channel 230 and a first portion 251 of transition region 250, and FIG. 9 is a schematic section view of substrate 202 during formation of micro-channel 230 taken along lines 9-9 shown in FIG. 8. To form micro-channel 230 and first portion 251 of transition region 250, first forming tool 300 is moved between first position 302 and second position 304 in a direction parallel to micro-channel longitudinal axis 246. Additionally or alternatively, first forming tool 300 rotates about an axis transverse to micro-channel longitudinal axis 246 (or out of the page in the view of FIG. 8) to form micro-channel 230 and first portion 251. In addition, as first forming tool 300 traverses between first position 302 and second position 304 and/or rotates about the axis transverse to micro-channel longitudinal axis 246, first forming tool 300 is rotated about an axis parallel to micro-channel longitudinal axis 246 between a first orientation 303 and a second orientation 305.

More specifically, first forming tool 300 creates gap 238 in substrate first surface 204, and removes material from substrate 202 to define micro-channel 230 and a portion of transition region 250. First orientation 303 and second orientation 305 are configured to enable first forming tool 300 to define first channel wall 234 of the exemplary reentrant cross-sectional shape of micro-channel 230 and first transition wall 252 of first portion 251, as described above, while maintaining gap 238 at a sufficiently small size to enable the at least one coating 212 to form second channel wall 236 in a sufficiently structurally stable fashion to enable micro-channel 230 to function as described herein. For example, in the exemplary embodiment, first forming tool 300 emits abrasive water jet 350 at a velocity that creates gap 238 in substrate first surface 204, and removes material from substrate 202 between first channel wall 234 and gap 238, and between first transition wall 252 and gap 238. In alternative embodiments, first forming tool 300 creates gap 238 in substrate first surface 204 and removes material from substrate 202 between first channel wall 234 and gap 238, and between first transition wall 252 and gap 238, in another suitable fashion to form any suitable cross-sectional shape for micro-channel 230 and first portion 251 of transition region 250.

It should be understood that, to form embodiments of hot gas path component 200 that do not include transition region 250, first forming tool 300 creates gap 238 in substrate first surface 204 and removes material from substrate 202 to define micro-channel 230 as described above, without removing material from substrate 202 to define first portion 251 of transition region 250.

In certain embodiments, first forming tool 300 traverses from first position 302 to second position 304 at a relatively slow rate and rotates between first orientation 303 and second orientation 305 at a relatively fast rate, such that micro-channel 230 and first portion 251 are formed in a single pass of first forming tool 300 between first position 302 and second position 304. In alternative embodiments, micro-channel 230 and first portion 251 are formed by a plurality of passes of first forming tool 300 between first position 302 and second position 304.

Figure 10:
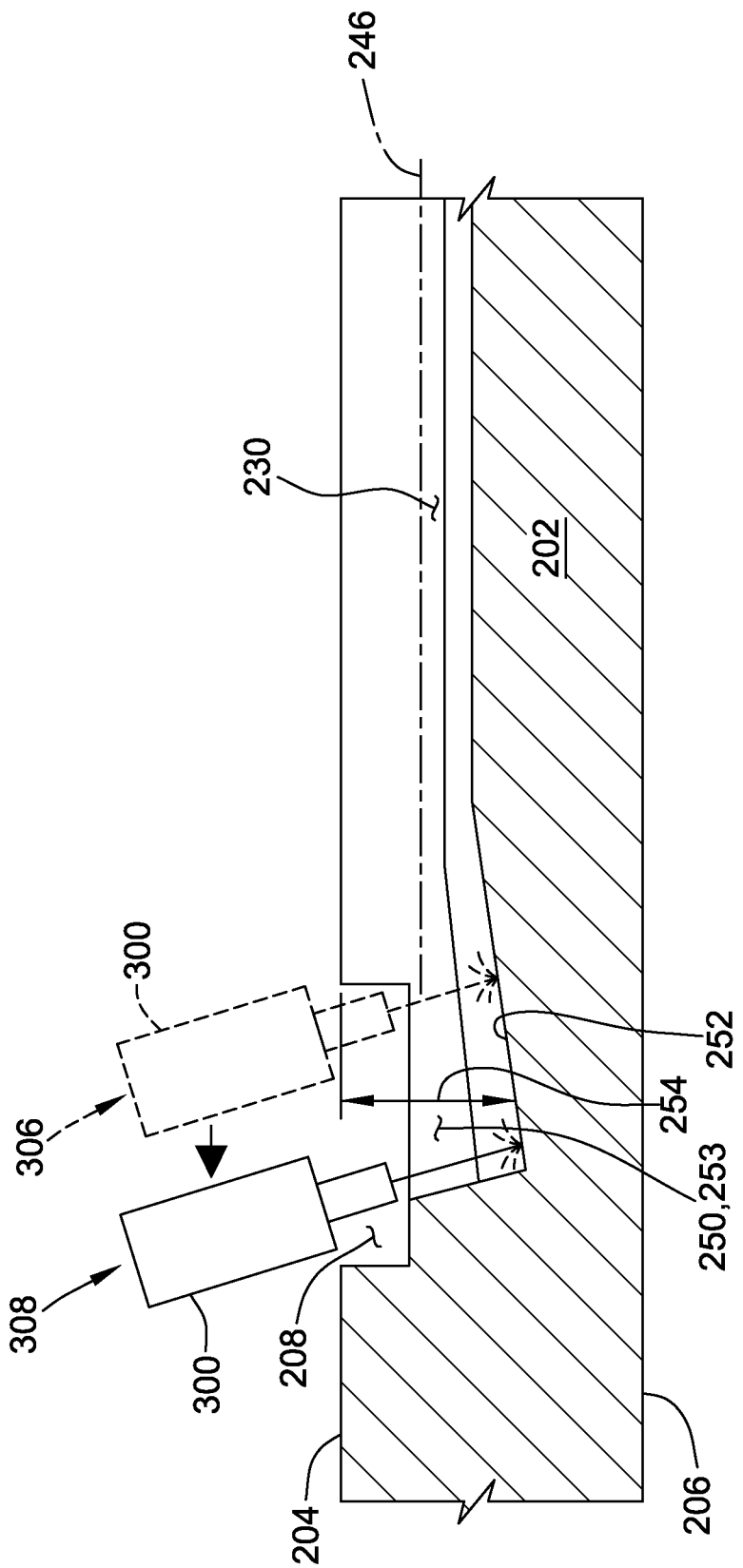
FIG. 10 is a schematic section view of the exemplary substrate shown in FIGS. 7-9 during formation of a portion of an exemplary transition region.

In certain embodiments, as a depth in substrate 202 from which first forming tool 300 removes material through gap 238 increases, an ability of forming tool to remove material with a precision that meets a predefined tolerance band decreases. For example, as depth 254 of transition region 250 increases, it becomes difficult for first forming tool 300 positioned above substrate first surface 204 to remove material from substrate 202 through gap 238 with a desired precision. FIG. 10 is a schematic section view of substrate 202 during formation of a second portion 253 of transition region 250. In certain embodiments, to form second portion 253, first forming tool 300 is moved to a third position 306 in which first forming tool 300 is at least partially within recess 208. Locating first forming tool 300 at least partially within recess 208 reduces a working distance between first forming tool 300 and first transition wall 252 of second portion 253 of transition region 250, thus facilitating removal of material from substrate 202 between recess 208 and first transition wall 252 with increased precision as depth 254 increases.

More specifically, first forming tool 300 creates gap 258 (shown in FIG. 2) in substrate 202 proximate recess 208, and removes material from substrate 202 to define second portion 253 of transition region 250. In some embodiments, first forming tool 300 is moved between third position 306 and a fourth position 308 in a direction parallel to micro-channel longitudinal axis 246 to form second portion 253. In some such embodiments, first forming tool 300 in fourth position 308 also is at least partially within recess 208 to facilitate removal of material from substrate 202 between recess 208 and first transition wall 252 with increased precision as depth 254 increases.

Additionally or alternatively, first forming tool 300 rotates about an axis transverse to micro-channel longitudinal axis 246 (or out of the page in the view of FIG. 10) to form second portion 253. In addition, as first forming tool 300 traverses between third position 306 and fourth position 308 and/or rotates about the axis transverse to micro-channel longitudinal axis 246, first forming tool 300 is rotated about an axis parallel to micro-channel longitudinal axis 246, similar to the rotation between first orientation 303 and second orientation 305 shown in FIG. 9. For example, in the exemplary embodiment, first forming tool 300 is rotated about the axis parallel to micro-channel longitudinal axis 246 to form first transition wall 252 that defines second portion 253 having a reentrant cross-sectional shape, enlarged but similar to the cross-sectional shape shown in FIG. 9 for micro-channel 230.

In certain embodiments, gap 258 is increased as first forming tool 300 moves from third position 306 to fourth position 308, as described above with respect to FIG. 2, and the increase in gap 258 enables first forming tool 300 to operate with greater power and/or precision to form second portion 253. Because gap 258 is positioned to be sealed by insert 210, rather than by the at least one coating 212, in certain embodiments gap 258 can be larger than gap 238 without decreasing a structurally stability of transition region 250. In alternative embodiments, gap 258 is not increased as first forming tool 300 moves from third position 306 to fourth position 308.

It should be understood that, to form embodiments of hot gas path component 200 that do not include transition region 250, substrate 202 does not include recess 208 and/or first forming tool 300 is not positioned in third position 306 or fourth position 308 at least partially within recess 208.

Figure 11:
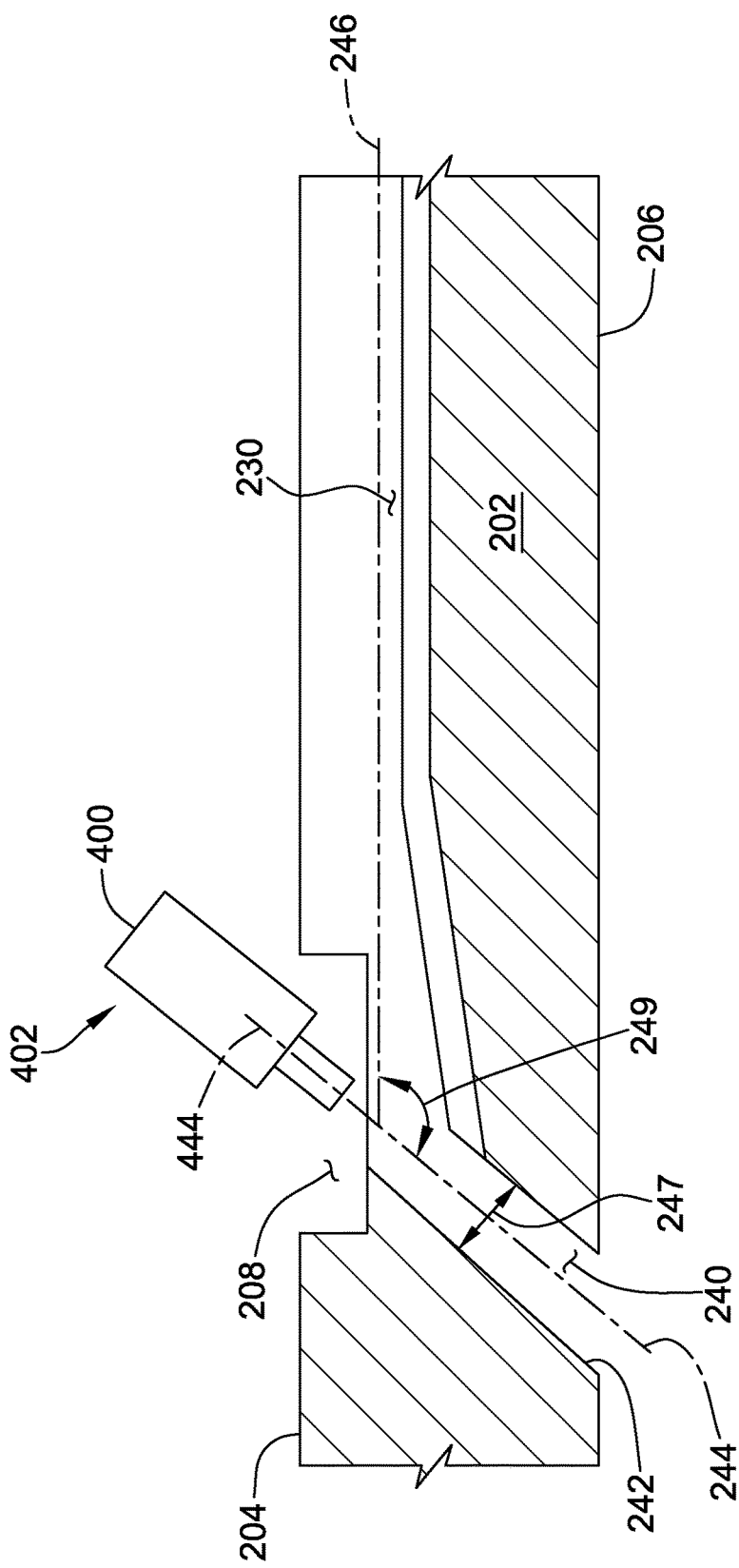
FIG. 11 is a schematic section view of the exemplary substrate shown in FIGS. 7-10 during formation of an exemplary inlet opening.

FIG. 11 is a schematic section view of substrate 202 during formation of inlet opening 240. In certain embodiments, a second forming tool 400 is used to form inlet opening 240. For example, second forming tool 400 removes material from substrate 202 within diameter 247 along inlet opening longitudinal axis 244 between recess 208 and substrate second surface 206. For another example, in embodiments in which substrate 202 does not include recess 208, second forming tool 400 removes material from substrate 202 within diameter 247 along inlet opening longitudinal axis 244 between substrate first surface 204 and substrate second surface 206.

In certain embodiments, second forming tool 400 is at least one of an abrasive liquid jet, a plunge electrochemical machining (ECM) tool, an electric discharge machining (EDM) tool with a spinning single point electrode ("milling" EDM), and a laser machining (laser drilling) tool. For example, in the exemplary embodiment, second forming tool 400 is a suitable commercial, off-the-shelf EDM device that emits a series of rapidly recurring electrical current discharges to erode substrate material 202. In alternative embodiments, second forming tool 400 is any other suitable forming tool that enables hot gas path component 200 to be formed as described herein. For example, in certain embodiments, first forming tool 300 also is applied as second forming tool 400.

In some embodiments, the use of insert 210 enables hot gas path component 200 to be formed using commercial, off-the-shelf embodiments of first forming tool 300 and second forming tool 400. For example, in some embodiments, a relatively small size of gap 238 is required to enable the at least one coating 212 to form second channel wall 236 in a sufficiently structurally stable fashion to enable micro-channel 230 to function as described herein. However, applying second forming tool 400 through such a small gap 238 to form inlet opening 240, which extends from flow communication with micro-channel 230, through substrate 202, to second surface 206, presents technical difficulties for commercial, off-the-shelf devices. In some such embodiments, a commercial, off-the-shelf device must be modified, for example to improve a precision control and stability of the device, to obtain a second forming tool 400 capable of forming inlet opening 240 within selected tolerance limits through gap 238. Such modifications to second forming tool 400 increase a cost and time required to produce hot gas path component 200. In contrast, applying a commercial, off-the-shelf second forming tool 400 to form inlet opening 240 within selected tolerance limits is possible in some such embodiments by extending inlet opening 240 to one of recess 208 and substrate first surface 204, where it exceeds a size of gap 238, and using insert 210, rather than the at least one coating 212, to seal the correspondingly larger opening.

Figure 12:
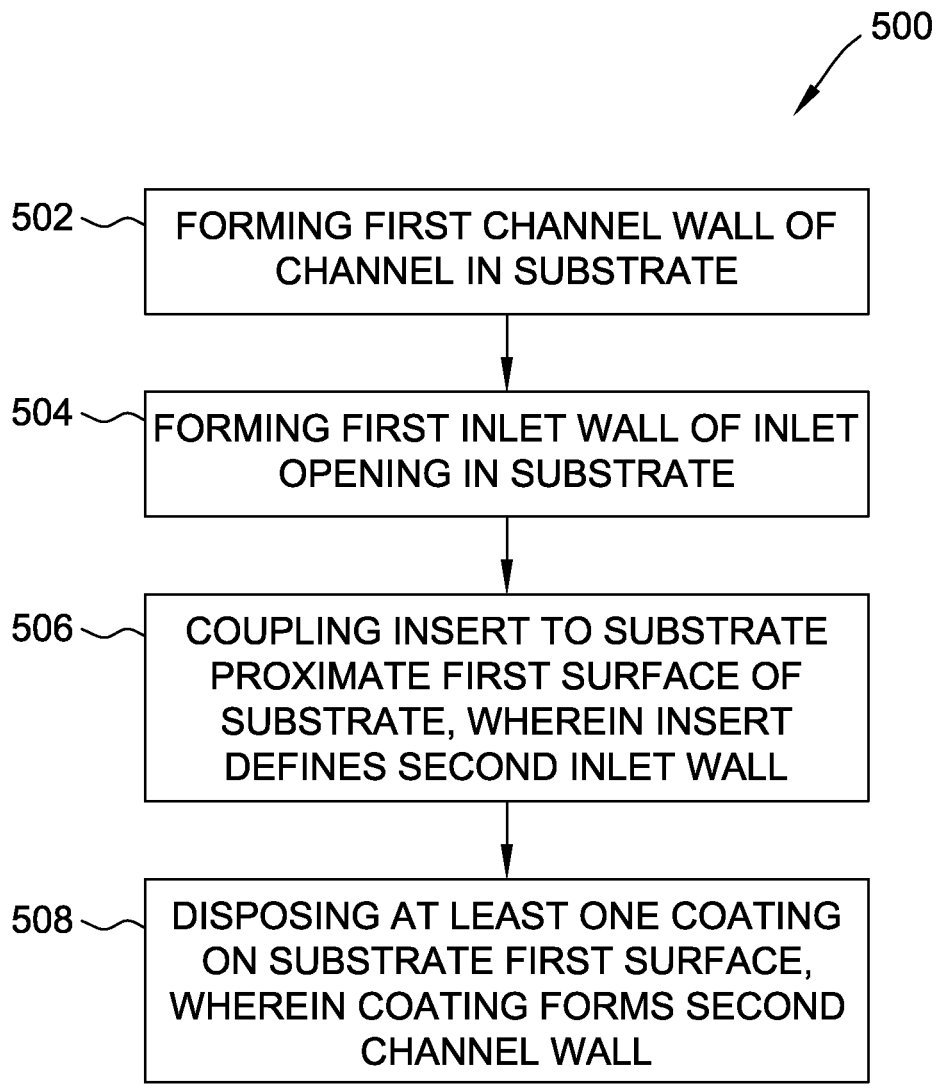
FIG. 12 is a flow diagram of an exemplary method of forming a component, such as the component shown in FIGS. 2-6, for a turbine engine, such as the exemplary turbine engine shown in FIG. 1.

An exemplary method 500 of forming a component, such as hot gas path component 200, for a turbine engine, such as gas turbine 10, is illustrated in a flow chart in FIG. 12. With reference also to FIGS. 1-11, exemplary method 500 includes forming 502 a first channel wall, such as first channel wall 234, of a channel, such as micro-channel 230, in a substrate, such as substrate 202. Method 500 also includes forming 504 a first inlet wall, such as first inlet wall 242, of an inlet opening, such as inlet opening 240, in the substrate. Method 500 further includes coupling 506 an insert, such as insert 210, to the substrate proximate a first surface of the substrate, such as substrate first surface 204. The insert defines a second inlet wall, such as second inlet wall 248, of the inlet opening. Additionally, method 500 includes disposing 508 at least one coating, such as the at least one coating 212, on the substrate first surface. The at least one coating forms a second channel wall, such as second channel wall 236, of the channel. The inlet opening is defined in flow communication with the channel.

Exemplary embodiments of a turbine component that includes channels for cooling fluid, and a method for forming the component, are described above in detail. The embodiments provide an advantage in reducing a pressure loss of a coolant flow through an inlet opening and channel, and in reducing stress concentrations at an interface between the inlet opening and the channel. The embodiments also provide an advantage in that the channel and inlet opening may be formed using commercial, off-the-shelf equipment.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

While the disclosure has been described in terms of various specific embodiments, those skilled in the art will recognize that the disclosure can be practiced with modification within the spirit and scope of the claims. Although specific features of various embodiments of the disclosure may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

What is claimed is:

1. A component for a turbine engine, said component comprising:
   a substrate comprising a substrate first surface, said substrate first surface comprising a recess defined therein;
   an insert coupled to said substrate proximate said substrate first surface, wherein said insert is shaped complementary to a shape of said recess;
   a channel defined by a first channel wall formed in said substrate and a second channel wall formed by at least one coating disposed on said substrate first surface;

an inlet opening defined in flow communication with said channel, said inlet opening defined by a first inlet wall formed in said substrate and a second inlet wall defined by said insert; and a transition region between said channel and said inlet opening such that said transition region is in flow communication with said channel and is at least partially defined by a first transition wall formed in said substrate and a second transition wall formed by said insert.

2. The component of claim 1, wherein a longitudinal axis of said inlet opening intersects a longitudinal axis of said channel at an angle that is obtuse.

3. The component of claim 1, wherein said insert comprises a plug disposed in said inlet opening proximate said substrate first surface.

4. The component of claim 1, wherein a depth of said transition region decreases between said inlet opening and said channel.

5. A turbine engine comprising:

a combustor section configured to generate a hot gas; and a component disposed along a path configured to be traversed by the hot gas, said component comprising:

a substrate comprising a substrate first surface, said substrate first surface comprising a recess defined therein;

an insert coupled to said substrate proximate said substrate first surface, wherein said insert is shaped complementary to a shape of said recess;

a channel defined by a first channel wall formed in said substrate and a second channel wall formed by at least one coating disposed on said substrate first surface;

an inlet opening defined in flow communication with said channel, said inlet opening defined by a first inlet wall formed in said substrate and a second inlet wall defined by said insert; and a transition region disposed between said channel and said inlet opening such that said transition region is in flow communication with said channel and is at least partially defined by a first transition wall formed in said substrate and a second transition wall formed by said insert.

6. The turbine engine of claim 5, wherein a longitudinal axis of said inlet opening intersects a longitudinal axis of said channel at an angle that is obtuse.

7. The turbine engine of claim 5, wherein said insert comprises a plug disposed in said inlet opening proximate said substrate first surface.

8. The turbine engine of claim 5, wherein a depth of said transition region decreases between said inlet opening and said channel.

9. A method of forming a component for a turbine engine, said method comprising:

forming a first channel wall of a channel in a substrate;

forming a first inlet wall of an inlet opening in the substrate;

forming a recess in the substrate first surface;

coupling an insert to the substrate proximate a first surface of the substrate, wherein the insert defines a second inlet wall of the inlet opening, and wherein the insert is shaped complementary to a shape of the recess;

disposing at least one coating on the substrate first surface, wherein the at least one coating forms a second channel wall of the channel, the inlet opening defined in flow communication with the channel; and forming a transition region between the channel and the inlet opening such that the transition region is in flow communication with the channel and is at least partially defined by a first transition wall formed in the substrate and a second transition wall formed by the insert.

10. The method of claim 9, further comprising forming the first inlet wall such that a longitudinal axis of the inlet opening intersects a longitudinal axis of the channel at an angle that is obtuse.

11. The method of claim 9, wherein said coupling the insert to the substrate comprises disposing a plug in the inlet opening proximate the substrate first surface.

12. The method of claim 9, further comprising forming the transition region such that a depth of the transition region decreases between the inlet opening and the channel.

* * * * *